United States Patent
O'Flaherty et al.

(10) Patent No.: US 6,631,361 B1
(45) Date of Patent: Oct. 7, 2003

(54) METHOD AND APPARATUS FOR PROVIDING EXPLANATIONS OF AUTOMATED DECISIONS APPLIED TO USER DATA

(75) Inventors: Kenneth W. O'Flaherty, La Jolla, CA (US); Brian Don Tate, Escondido, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/410,532

(22) Filed: Oct. 1, 1999

Related U.S. Application Data (60) Provisional application No. 60/102,832, filed on Oct. 2, 1998, and provisional application No. 60/102,831, filed on Oct. 2, 1998.

(51) Int. Cl.$^7$ .............................................. G06F 17/00
(52) U.S. Cl. ...................................... 706/47; 707/100
(58) Field of Search ............................ 706/47, 50, 46; 707/100

(56) References Cited

U.S. PATENT DOCUMENTS

| | | | |
|---|---|---|---|
| 5,402,524 A | | 3/1995 | Bauman et al. |
| 5,537,590 A | * | 7/1996 | Amado .......................... 707/2 |
| 5,835,087 A | | 11/1998 | Herz et al. ................... 345/810 |
| 5,910,988 A | | 6/1999 | Ballard ......................... 705/75 |
| 6,253,027 B1 | * | 6/2001 | Weber et al. ............... 386/287 |

FOREIGN PATENT DOCUMENTS

| | | | |
|---|---|---|---|
| DE | 0529130 | * 8/1991 | ............. G06F/9/44 |
| EP | 0 529 130 A1 | 3/1993 | |

OTHER PUBLICATIONS

Kokol P. et al: "Engineering for Intelligent Systems" Proc. of 1999 IEEE Int. Conf. on Systems, Man, and Cybernetics, vol. 6, Oct. 12–15, 1999, pp. 306–3111, XP002155061.

President William J. Clinton, Vice President Albert Gore Jr., "A Framework For Global Electronic Commerce," Jul. 1997, at http://www.iitf.nist.gov/eleccomm/ecomm.htm, pp. 1–22.

Markoff, John, "U.S. and Europe Clash Over Internet Consumer Privacy," Jul. 1, 1998 at http://search.nytimes.com/search/daily/b...astweb?getdoc+site+site+35855+0+wAAA+P, pp. 1–3.

"OECD Guidelines on the Protection of Privacy and Transborder Flows of Personal Data," Oct. 1, 1997 at http://www.oecd.org/dsti/sti/it/secur/prod/PRIV-EN.HTM, pp. 1–4.

"FTC Releases Report on Consumer' Online Privacy", Report to Congress on Privacy Online, Jun. 4, 1998, at http://www.ftc.gov/opa/9806/privacy2.htm, pp. 1–4.

"High Tech Industry Leaders Announce Self-Regulatory Plan to Ensure Online Privacy," Online Privacy Alliance Letter to President William J. Clinton, Jun. 3, 1998 (8 pages).

"Privacy and the National Information Infrastructure: Principles for Providing and Using Personal Information," Privacy Working Group, Information Policy Committee, Information Infrastructure Task Force, Jun. 6, 1995, at http://www.iitf.nist.gov/ipc/ipc/ipc-pubs/niiprivprin_final.htm, pp. 1–10.

(List continued on next page.)

*Primary Examiner*—George B. Davis
*Assistant Examiner*—Joseph P. Hirl
(74) *Attorney, Agent, or Firm*—Gates & Cooper (57) ABSTRACT

A method, apparatus, and article of manufacture for providing a description of logic used in determining an outcome based on automatic processing of data is disclosed. The method comprises the steps of hierarchically applying a series of decision criteria to the data to arrive at the outcome, while recording a rule determined from application of each decision criteria to the data, and retrieving the recorded rules. The article of manufacture comprises a data storage device tangibly embodying instructions to perform the method steps outlined above, and the apparatus for performing the method steps.

33 Claims, 8 Drawing Sheets

OTHER PUBLICATIONS

"Directive 96/46/EC of the European Parliament and of the Council," Oct. 24, 1995, Official Journal of the European Communities, Pages Nos. L281/31–L281/50.

"Directive 97/66/EC of the European Parliament and of the Council," Dec. 15, 1997, Official Journal of the European Communities, Jan. 30, 1998, Page Nos. L24/1–L24/8.

* cited by examiner

| CASE ID | OUTCOME | RULE ID |
|---------|---------|---------|
| PERSON 1 | APPROVE | 1<br>3 |
| PERSON 2 | DENY | 2<br>6 |
| PERSON 3 | APPROVE | 2<br>5 |

FIG. 6

| RULE ID | RULE |
|---------|------|
| 1 | INCOME > $50,000 |
| 2 | INCOME < $50,000 |
| 3 | HOMEOWNER |
| 4 | NOT HOMEOWNER |
| 5 | SAVINGS ACCOUNT |
| 6 | NO SAVINGS ACCOUNT |
| . . . | . . . |

| CASE ID | OUTCOME | RULE ID |
|---|---|---|
| PERSON 1 | APPROVE | 906A |
| PERSON 2 | DENY | 906B |
| PERSON 3 | APPROVE | 906D |

1002 — CASE ID · 1004 — OUTCOME · 1006 — RULE ID

| LEAF ID | RULE SET |
|---|---|
| 906A | INCOME > $50,000 AND OWN HOME |
| 906B | INCOME > $50,000 AND NOT HOME OWNER |
| 906C | INCOME < $50,000 AND NO SAVINGS ACCOUNT |
| 906D | INCOME < $50,000 AND SAVINGS ACCOUNT |

1102 — LEAF ID · 1104 — RULE SET

| LEAF ID | RULE ID |
|---|---|
| 906A | 904A
904D |
| 906B | 904A
904E |
| 906C | 904B
904F |
| 906D | 904B
904G |

1202 — LEAF ID ; RULE ID — 1204

| RULE ID | RULE |
|---|---|
| 904A | INCOME > $50,000 |
| 904B | INCOME < $50,000 |
| 904C | HOMEOWNER |
| 904D | NOT HOMEOWNER |
| 904E | SAVINGS ACCOUNT |
| 904F | NO SAVINGS ACCOUNT |

1302 — RULE ID ; RULE — 1304

METHOD AND APPARATUS FOR PROVIDING EXPLANATIONS OF AUTOMATED DECISIONS APPLIED TO USER DATA

CROSS-REFERENCE TO RELATED APPLICATIONS

This application is related to the following co-pending and commonly assigned applications, each of which is hereby incorporated by reference herein:

U.S. Provisional Patent Application Serial No., 60/102,832, entitled "SYSTEM AND METHOD FOR PRIVACY-ENHANCED DATA WAREHOUSING," by Kenneth W. O'Flaherty, Reid M. Watts, David A. Ramsey, Adriaan W. Veldhuisen, Richard G. Stellwagen, Jr., Todd A. Walter, and Patric B. Dempster, filed Oct. 2, 1998;

Application Ser. No. 09/165,777, entitled "SYSTEM AND METHOD FOR MANAGING DATA PRIVACY IN A DATABASE MANAGEMENT SYSTEM," by Kenneth W. O'Flaherty, Reid M. Watts, and David A. Ramsey, Adriaan W. Veldhuisen, Richard G. Stellwagen, Jr., and Todd A. Walter, filed Oct. 2, 1998;

application Ser. No. 09/165,784, entitled "PRIVACY-ENHANCED DATABASE," by Kenneth W. O'Flaherty, Reid M. Watts, and David A. Ramsey, Adriaan W. Veldhuisen, Richard G. Stellwagen, Jr., and Todd A. Walter, filed Oct. 2, 1998;

application Ser. No. 09/165,457, entitled "PRIVACY-ENABLED LOYALTY CARD SYSTEM AND METHOD," by Kenneth W. O'Flaherty, Reid M. Watts, and David A. Ramsey, filed Oct. 2, 1998;

U.S. provisional patent application Serial No. 60/102,831, entitled "TERADATA SCALABLE DISCOVERY," by Timothy E. Miller, Brian D. Tate, James D. Hildreth, Miriam H. Herman, Todd M. Brye, and James E. Pricer, filed Oct. 2, 1998; and application Ser. No. 09/410,530, entitled "SQL-BASED ANALYTIC ALGORITHM FOR RULE INDUCTION," by Todd M. Brye, filed on same date herewith.

BACKGROUND OF THE INVENTION

1. Field of the Invention

The present invention relates to systems and methods for managing data stored in a data warehouse, and in particular to a method and system for providing a simplified description of logical processing of user data stored in the data warehouse.

2. Description of the Related Art

Database management systems are used to collect, store, disseminate, and analyze data. These large-scale integrated database management systems provide an efficient, consistent, and secure data warehousing capability for storing, retrieving, and analyzing vast amounts of data. This ability to collect, analyze, and manage massive amounts of information has become a virtual necessity in business today.

The information stored by these data warehouses can come from a variety of sources. One important data warehousing application involves the collection and analysis of information collected in the course of commercial transactions between businesses and consumers. For example, when an individual uses a credit card to purchase an item at a retail store, the identity of the customer, the item purchased, the purchase amount and other related information are collected. Traditionally, this information is used by the retailer to determine if the transaction should be completed, and to control product inventory. Such data can also be used to determine temporal and geographical purchasing trends.

Similar uses of personal data occur in other industries. For example, in banking, the buying patterns of consumers can be divined by analyzing their credit card transaction profile or their checking/savings account activity, and consumers with certain profiles can be identified as potential customers for new services, such as mortgages or individual retirement accounts. Further, in the telecommunications industry, consumer telephone calling patterns can be analyzed from call-detail records, and individuals with certain profiles can be identified for selling additional services, such as a second phone line or call waiting.

Additionally, data warehouse owners typically purchase data from third parties, to enrich transactional data. This enrichment process adds demographic data such as household membership, income, employer, and other personal data.

The data collected during such transactions is also useful in other applications. For example, information regarding a particular transaction can be correlated to personal information about the consumer (age, occupation, residential area, income, etc.) to generate statistical information. In some cases, this personal information can be broadly classified into two groups: information that reveals the identity of the consumer, and information that does not. Information that does not reveal the identity of the consumer is useful because it can be used to generate information about the purchasing proclivities of consumers with similar personal characteristics. Personal information that reveals the identity of the consumer can be used for a more focused and personalized marketing approach in which the purchasing habits of each individual consumer are analyzed to identify candidates for additional or tailored marketing.

Another example of an increase in the collection of personal data is evidenced by the recent proliferation of "membership" or "loyalty" cards. These cards provide the consumer with reduced prices for certain products, but each time the consumer uses the card with the purchase, information about the consumer's buying habits is collected. The same information can be obtained in an on-line environment, or purchases with smart cards, telephone cards, and debit or credit cards.

Unfortunately, while the collection and analysis of such data can be of great public benefit, it can also be the subject of considerable abuse. In the case of loyalty programs, the potential for such abuse can prevent many otherwise cooperative consumers from signing up for membership awards or other programs. It can also discourage the use of emerging technology, such as cash cards, and foster continuation of more conservative payment methods such as cash and checks. In fact, public concern over privacy is believed to be a factor holding back the anticipated explosive growth in web commerce. For the foregoing reasons, a privacy-enhanced data warehouse has been developed, as described in the above cross-referenced patent applications.

As can be seen by the foregoing, the protection of private data is a growing consumer issue around the world. This consumer issue is reflected in legislation in many countries, which place certain requirements on organizations that collect, process, and disseminate information.

Much of this legislation is based on European Union (EU) Directive 95/46/EC regarding "the protection of individuals with regard to automatic processing of personal data", which went into effect in October 1998. One of the requirements of the EU Directive relates to explaining automated decisions: the data subject's right of access to data includes the right to obtain "knowledge of the logic involved in any automatic processing of data concerning him". This applies in particular to decisions that produce significant legal effects or evaluate certain personal aspects, such as "performance at work, creditworthiness, reliability, conduct, etc.". A similar requirement exists in the US and some other countries relative to credit decisions, whereby a financial institution declining credit is obligated to be able to explain the reasons for the decision.

Businesses frequently make automated decisions of this nature. Banks and other institutions that extend credit typically perform some kind of credit scoring. Automated checks for potential fraud or misuse are often made on credit card transactions, sometimes in real time, with the transaction being either denied or referred to a human for review. Similarly, long distance or mobile phone call activity is often monitored for possible fraudulent usage, sometimes resulting in the service being cut off.

Many institutions today use data mining techniques to help make better automated decisions. Data mining algorithms can usually handle more data and more variables than can a human, in determining the criteria for a decision. For example, in credit scoring, a human might be able to discern that high income, home ownership, and number of children are key indicators of credit risk, and develop a simple set of rules based on the observed factors. But data mining techniques can examine large numbers of cases each with tens or hundreds of such variables, and pick out and blend the five or ten variables that are the best propensity indicators. These would then typically represent a better set of "rules" for the credit scoring function. The most common data mining techniques used today in building such "propensity models" are neural networks and decision trees. Neural networks produce a model that combines the factors it selects into a "fuzzy" decision matrix that is not well understood by humans.

Conversely, decision trees, produce a model that is well understood by humans, and can in fact be converted into a set of rules (two of which might be: "if income is greater than $50,000, and if homeowner, and if married with no more than two children, then credit risk is good"; and "if income is greater than $50,000, and if not homeowner, and if not married, then credit risk is good").

Decision trees are more explainable than neural networks. From a decision tree model, it is possible to create a full set of rules that govern the decisions made for all cases that are passed through the model. It is thus possible to explain credit decisions in a general sense, based on the set of rules that apply to all cases. But if an individual wanted an explanation of the specific reason(s) that applied in his case, this would not be possible without examining the set of rules and the specific set of data relating to the individual. This would be a difficult and laborious process, requiring some effort to gather up all of the relevant data for the individual, and to then examine the data and the rule set to determine which rule applied in this case.

From the foregoing, it can be seen that there is a need for providing a description of the logic that was used make an automated processing decision based on customer's personal data. The present invention satisfies that need.

SUMMARY OF THE INVENTION

To address the requirements described above, the present invention discloses a method, apparatus, and article of manufacture for providing a description of logic used in determining an outcome based on automatic processing of data.

The method comprises the steps of hierarchically applying a series of decision criteria to the data to arrive at the outcome, while recording a rule determined from application of each decision criteria to the data, and retrieving the recorded rules. The article of manufacture comprises a data storage device tangibly embodying instructions to perform the method steps outlined above, and the apparatus comprises a means for performing these method steps This provides an automated way of recording the rule that applies to each decision made by a decision tree model, thereby making all decisions easily explainable. During execution of the decision tree, as each case is passed through the tree, the rules that apply to the case are recorded, along with the decision.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
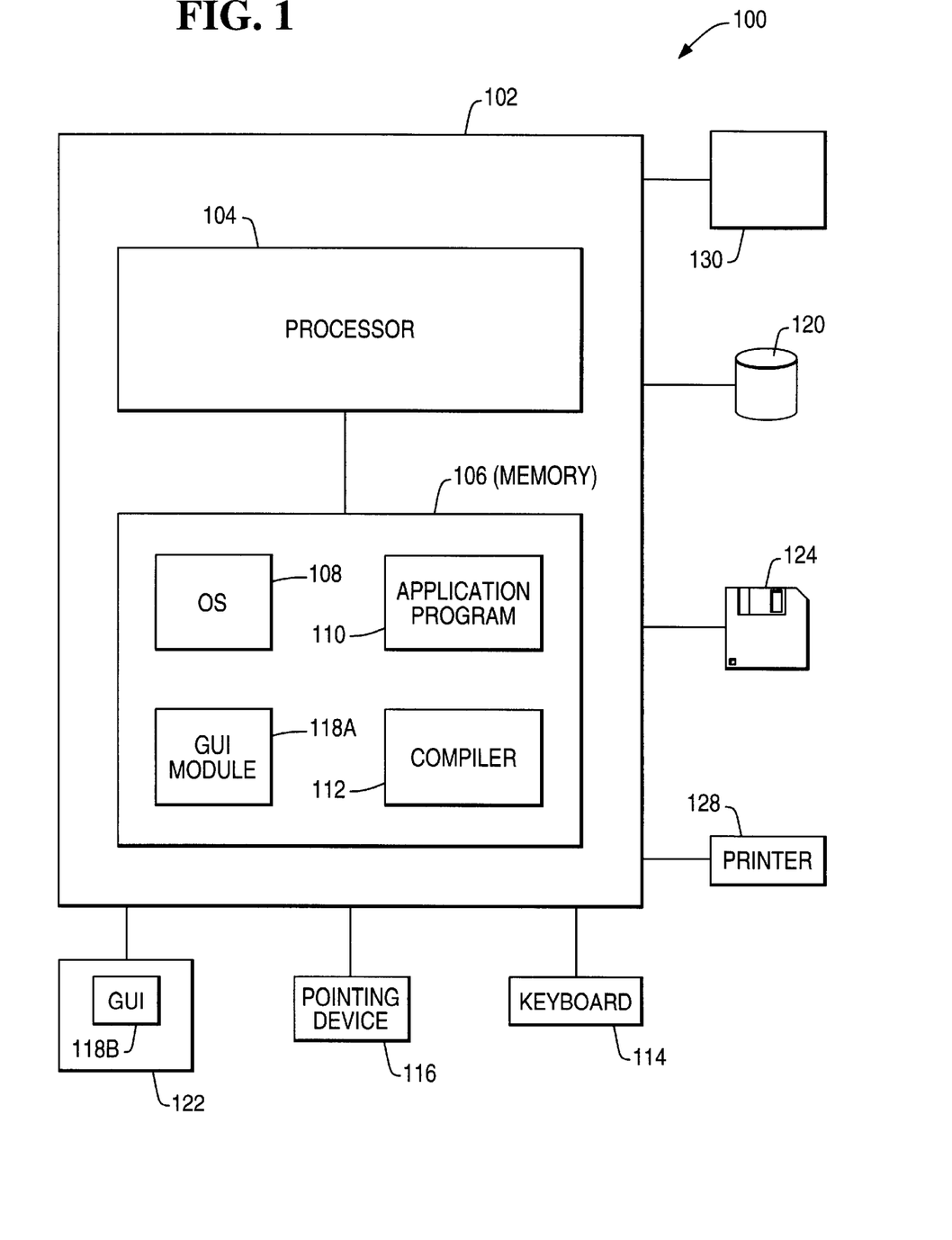
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112. The computer 102 also optionally comprises an external communication device such as a modem, satellite link, Ethernet card, or other device for communicating with other computers.

In one embodiment, the computer 102 manages the storage and retrieval of data in a database stored in one of the communicatively coupled storage devices. Further, using the external the communication devices, the computer 102 can communicate with similar devices to accept database commands such as database queries, and to transmit data including the results of the database queries.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture," "program storage device," and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
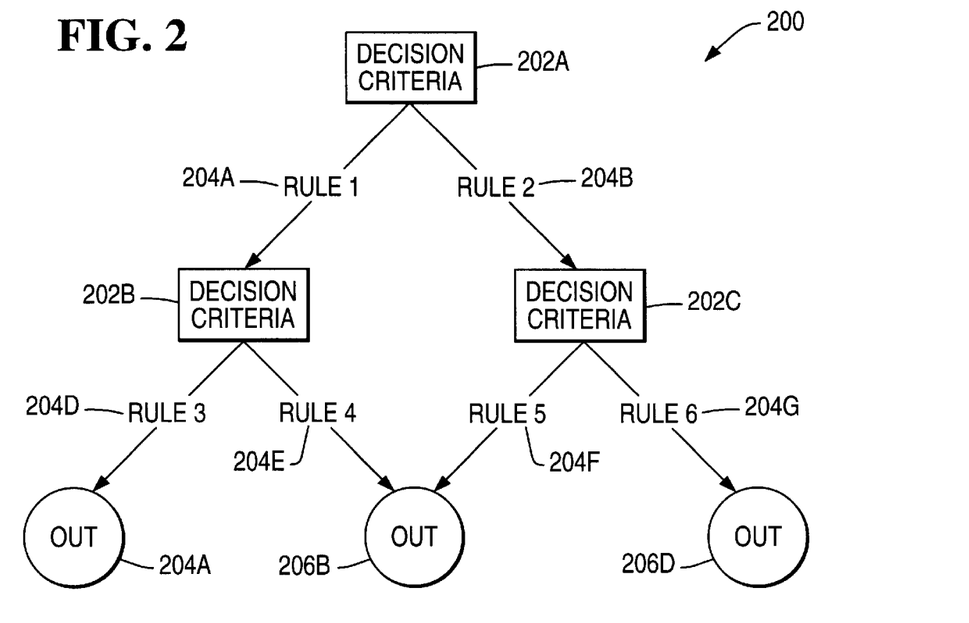
FIG. 2 is a diagram illustrating a decision tree.

FIG. 2 is a diagram illustrating a decision tree 200. The decision tree 200 comprises a hierarchically organized set of decision criteria (including decision criteria 202A–202C, hereafter collectively referred to as decision criteria 202). In one embodiment, the decision criteria 202 includes yes/no or multiple choice questions. Rules 204A–204G (collectively referred to hereinafter as rules 204) are associated with the decision criteria 200, and reflect the application of the decision criteria 202 to the data. Data is applied to the decision criteria 202 one at a time, in hierarchical order. That is, the data is applied to a hierarchically superior decision criterion 202A, resulting in either rule 204A or rule 204B. Then, the data is applied to another decision criteria which is determined by the first rule (either decision criteria 202B or 202C, depending on whether rule 204A or 204B resulted from the application of the data to decision criteria 202A). The foregoing continues until the data is accurately classified or a pre-defined stopping point (such as one of the outcomes 206A–206C, hereinafter referred to collectively as outcomes 206) is reached. Hence, the decision criteria 202 classify data stored in the data warehouse into segments based on fields that most correlate with the target outcomes 206.

Figure 3:
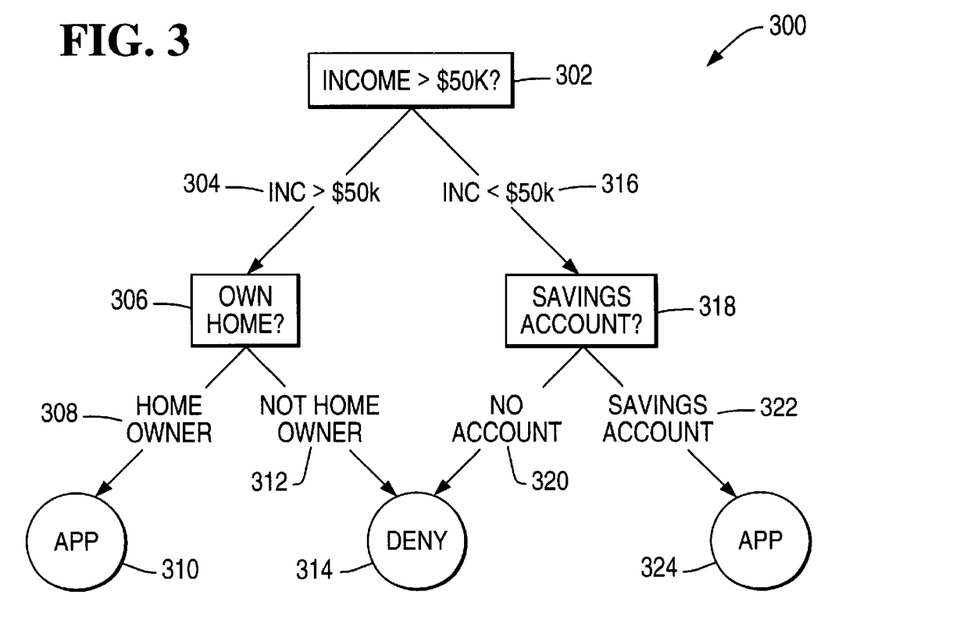
FIG. 3 is a diagram showing an exemplary decision tree, which could be used to determine the credit worthiness of an applicant.

FIG. 3 is a diagram showing an exemplary decision tree 300, which could be used to determine the credit worthiness of an applicant (whether the individual is a good risk or a bad risk). Here, the hierarchically superior criteria is the individual's income. The hierarchically superior criteria is usually selected as the decision criteria that is most highly correlated to the eventual outcome (and therefore among the decision criteria, provides the greatest insight as to the eventual outcome). The decision criteria 302 is associated with two rules, namely a first rule 304 indicating an annualized income of greater than or equal to $50,000, and a second rule 316 indicating an annualized income of less than $50,000.

The rule resulting from the application of the data to the hierarchically superior decision criteria determines which of the next decision criteria in the hierarchical organization of decision criteria is applied. If the application of the data to the first (hierarchically superior) decision criteria 302 determined rule 304 (income greater than $50,000), the data is applied to the next decision criteria 306, which questions whether the applicant is a homeowner. If so, the "home owner" rule 308 results, and the outcome 310 is reached, indicating that the person's load application should be approved. However, if the "not home owner" rule 312 results, the decision tree 300 reaches the outcome 312 that the loan should be denied. Similarly, if the application of applicant data to the income decision criteria 302 resulted in rule 316, indicating that the applicants annualized income is less than $50,000, the next decision criteria to be applied to the data determines whether the applicant has a savings account. If the applicant does not have such an account, rule 320 results, and the outcome 314 is that the application should be denied. If the applicant has such an account, the outcome 324 is that the application is granted.

Initially, decision trees 200 can be built from "training" data where the outcome is already known, e.g. data from prior credit histories, including data classifying the outcome (i.e. good risk/bad risk) along with a set of data fields having decision criteria that may be relevant to the classification problem (e.g. income, home ownership, marital status, number of children, account ownership, balances, debts, prior loans, etc.). The decision tree 200 is built by an algorithm that analyzes each of the fields in the training data and iteratively selects a field to split the data on, based on how well the field segregates the data in like segments. Thus, in the earlier example, it might pick income as the field that, when set at $50,000, splits the data into two segments where one segment is dominantly "good risk" and the other is dominantly "bad risk"; it would then take the "income>$50,000" segment and determine a split based on home ownership that would further stratify this segment into two subsegments where the "income>$50,000 and homeowner" subsegment is even more dominantly "good risk" whereas the "income>$50,000 and not homeowner subsegment tends more to "bad risk".

The resulting decision tree 300 can then be used to predict outcomes on new data—e.g. to predict the likelihood of new credit applicants to be good credit risks. In order to achieve this, the decision tree 300 is presented with cases which include values for the data fields which the decision tree 300 uses as decision criteria (in the foregoing simplified example, "income", "home ownership", and "savings account ownership"). In this example, the decision tree 300 could be deployed in an automated program that processes credit applications, or in an interactive environment where bank officials are processing applications on-line. In such deployments, new cases are individually passed through the decision tree 300, and fall out at the bottom of the decision tree 300 with an outcome or classification (e.g., as "approve" or "deny").

Figure 4:
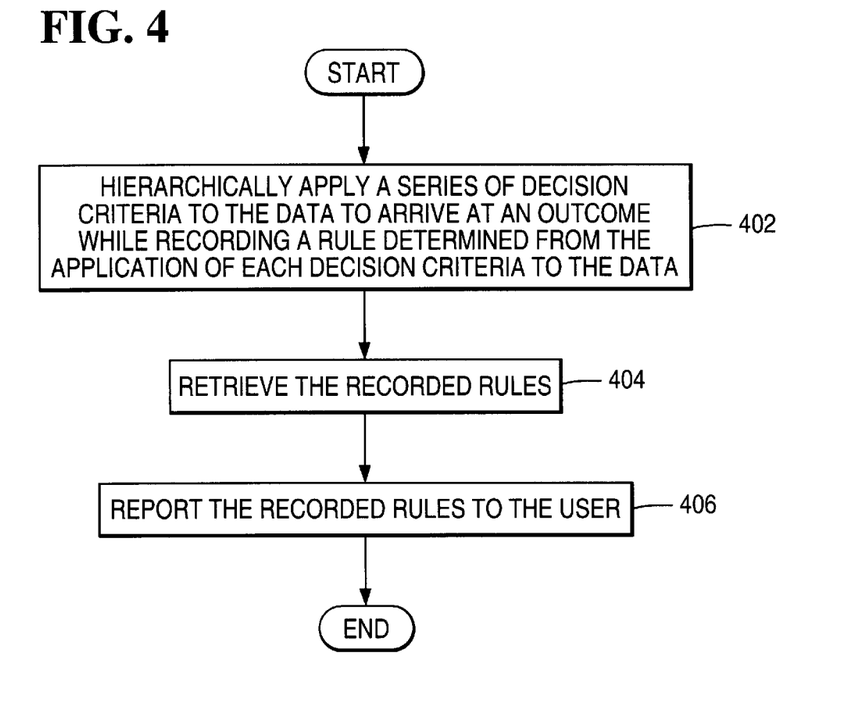
FIG. 4 is a flow chart illustrating exemplary process steps used to practice one embodiment of the present invention.
Figure 5:
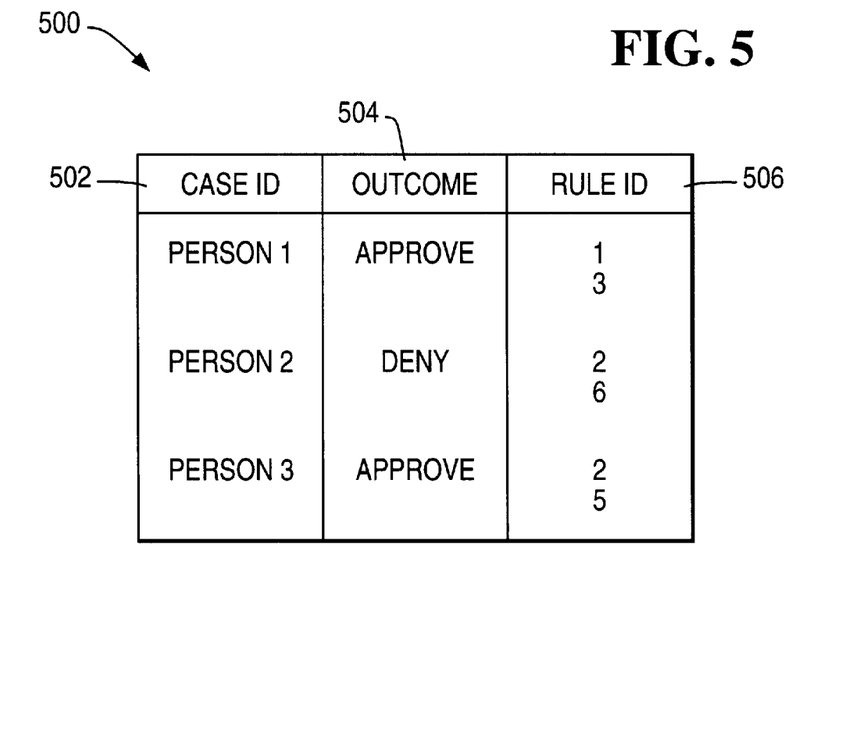
FIG. 5 is a diagram presenting an illustrative embodiment of a result table.

FIG. 4 is a flow chart illustrating exemplary process steps used to practice one embodiment of the present invention. A series of decision criteria 202 is hierarchically applied 402 to the data to arrive at an outcome 206. This is accomplished while recording a rule 204 determined from the application of each decision criteria 202 in the series to the data. The recorded rules 204 are then retrieved 404. In one embodiment, the rule obtained from the application of each decision criteria is recorded in a result table, and the step of retrieving the recorded rules is achieved by joining the result table with a rule table further described below. Finally, the retrieved recorded rules are provided to the user, as shown in block 406 FIG. 5 is a diagram presenting an illustrative embodiment of a result table 500. The result table comprises a first column 502 having an identification describing the particular case (application of the hierarchical set of decision criteria to the data). A second column 504 indicates the outcome for the case (in the illustrated example, whether the loan was approved or disapproved). A third column 506 stores an identification for each of the rules that were recorded while passing through the decision tree 300. The identification can comprise, for example, numbers, letters, or other characters at least locally unique to the result table 500. A corresponding identification is also stored in a rule table. Different result table physical and logical models are possible. For example, the identification or "Rule ID" for each case can be stored in a series of columns adjacent to column 506.

Figure 6:
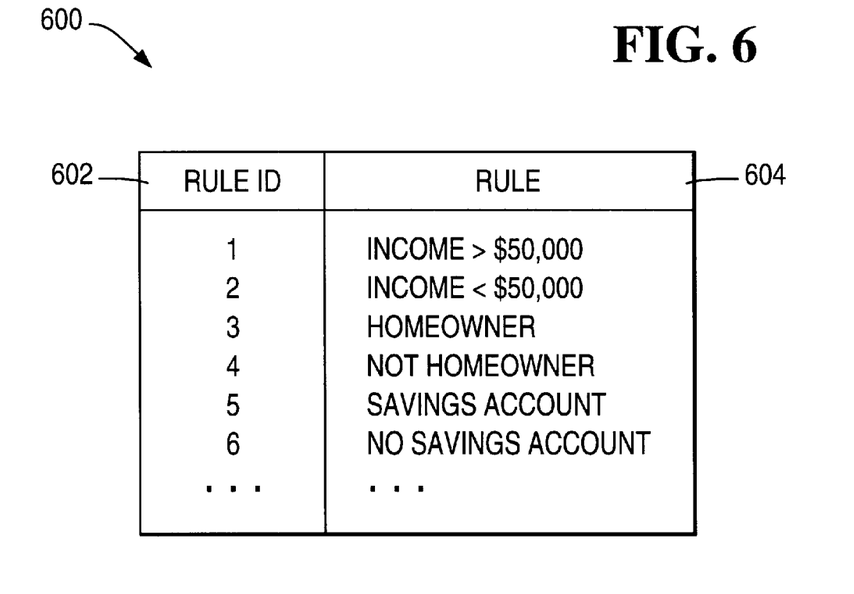
FIG. 6 is a diagram presenting an illustrative embodiment of a rule table.

FIG. 6 is a diagram presenting an illustrative embodiment of a rule table 600. The rule table 600 includes a first column 602 storing an identification for all of the decision tree 200 rules 204. The rule table 600 also includes a column storing the rules 204 associated with the decision criteria 202. Hence, the rule table 600 provides a mapping between the rule identification and a description of the rule. The rule table 600 and the result table 500 can be joined on the rule identification to retrieve the recorded rules.

Figure 7:
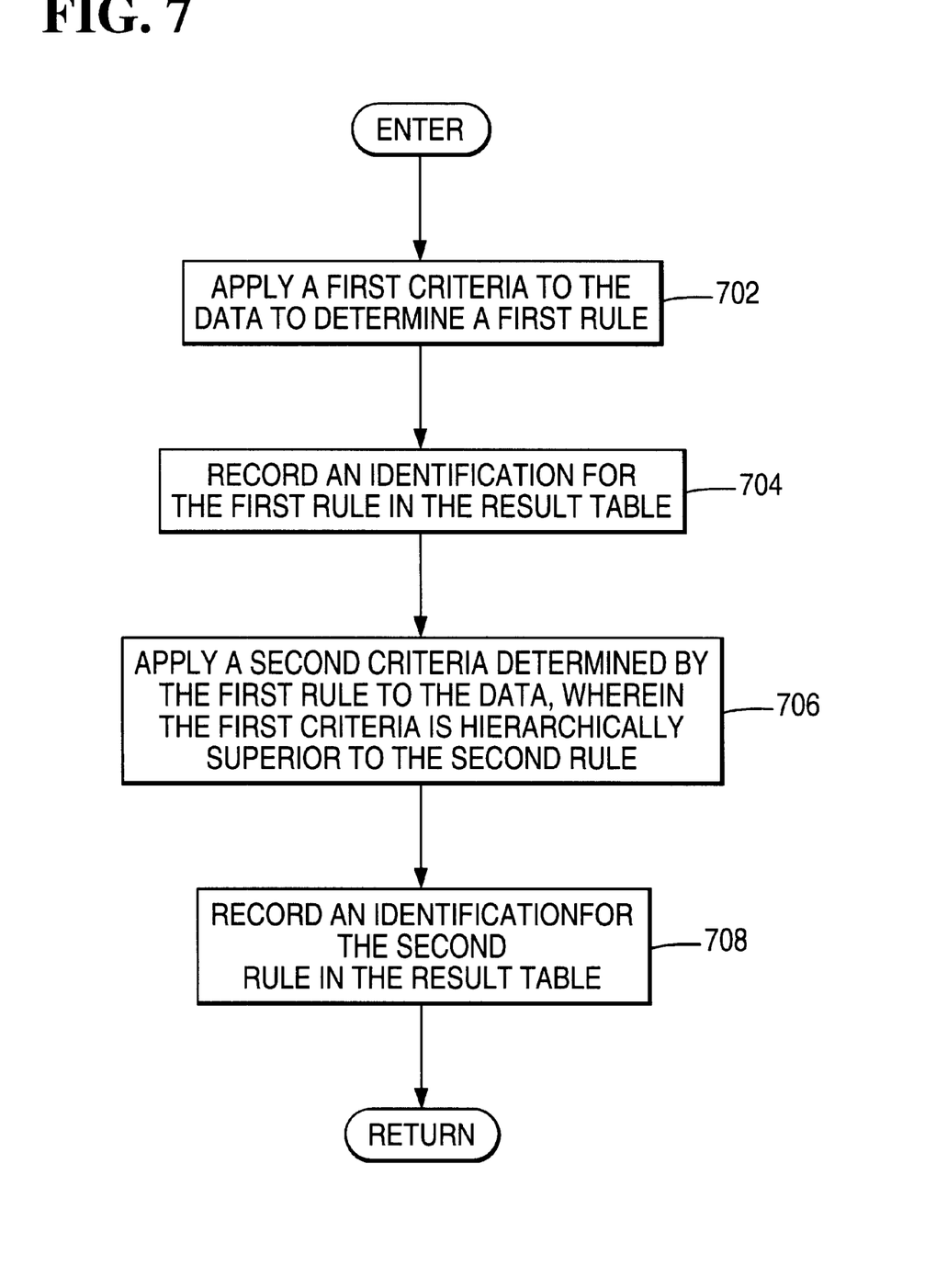
FIG. 7 is a flow chart depicting exemplary process steps used to practice the step of hierarchically applying a series of decision criteria to the data while recording a rule determined from application of each decision criteria to the data.

FIG. 7 is a flow chart depicting exemplary process steps used to practice the step of hierarchically applying a series of decision criteria to the data while recording a rule determined from application of each decision criteria to the data. First, a first decision criteria 202 is applied 702 to the data. The result of this application defines a first rule 202B. An identification for the first rule 202B is recorded 704. In one embodiment, the identification is recorded in the third column 506 of the result table 500. A second decision criteria (either 202B or 202C, as determined by the first rule 204 obtained by applying the first decision criteria 202 to the data), which is hierarchically inferior to the first decision criteria 202A is then applied 706. An identification for the second rule is then recorded 708 in the result table 500. This process of applying data to each decision criteria one at a time, while recording the resulting rule in the result table is performed until a complete path from the hierarchically highest decision criteria 202A to an outcome 206 at the bottom of the decision tree 200 is obtained.

FIG. 5 shows a result table illustrating three exemplary cases in which an applicant's data was processed by the decision tree. In the first case, the loan application was approved, and joining the result table 500 and the rule table 600 results in a logic description of "income>$50,000 and homeowner." In the second case, the loan application was denied, and joining the result table 500 with the rule table 600 results in a logic description of "income<$50,000 and no savings account." In the third case, the loan application was approved, and joining the result table 500 with the rule table 600 results in a logic description of "income<$50,000 and savings account."

Figure 8:
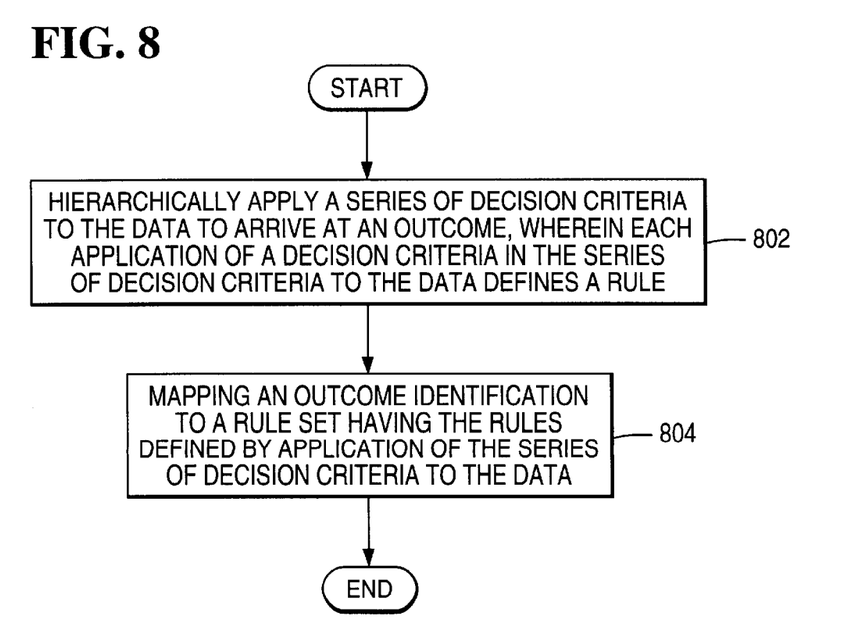
FIG. 8 is a flow chart illustrating exemplary process steps used to practice another embodiment of the present invention.

FIG. 8 is a flow chart illustrating exemplary process steps used to practice another embodiment of the present invention. A series of decision criteria 202 is hierarchically applied to the data to arrive at an outcome 206. Each application of the decision criteria 202 in the series of criteria to the data defines a rule 204. This is shown in block 802. For example, referring again to FIG. 2, decision criteria 202A is applied to the data, resulting in rule 1 204A. Thereafter, decision criteria 202B is applied to the data, resulting in rule 3 204D and outcome 206A. Next, an outcome identification is mapped 804 to a rule set having the set of rules defined by application of the series of decision criteria.

Figure 9:
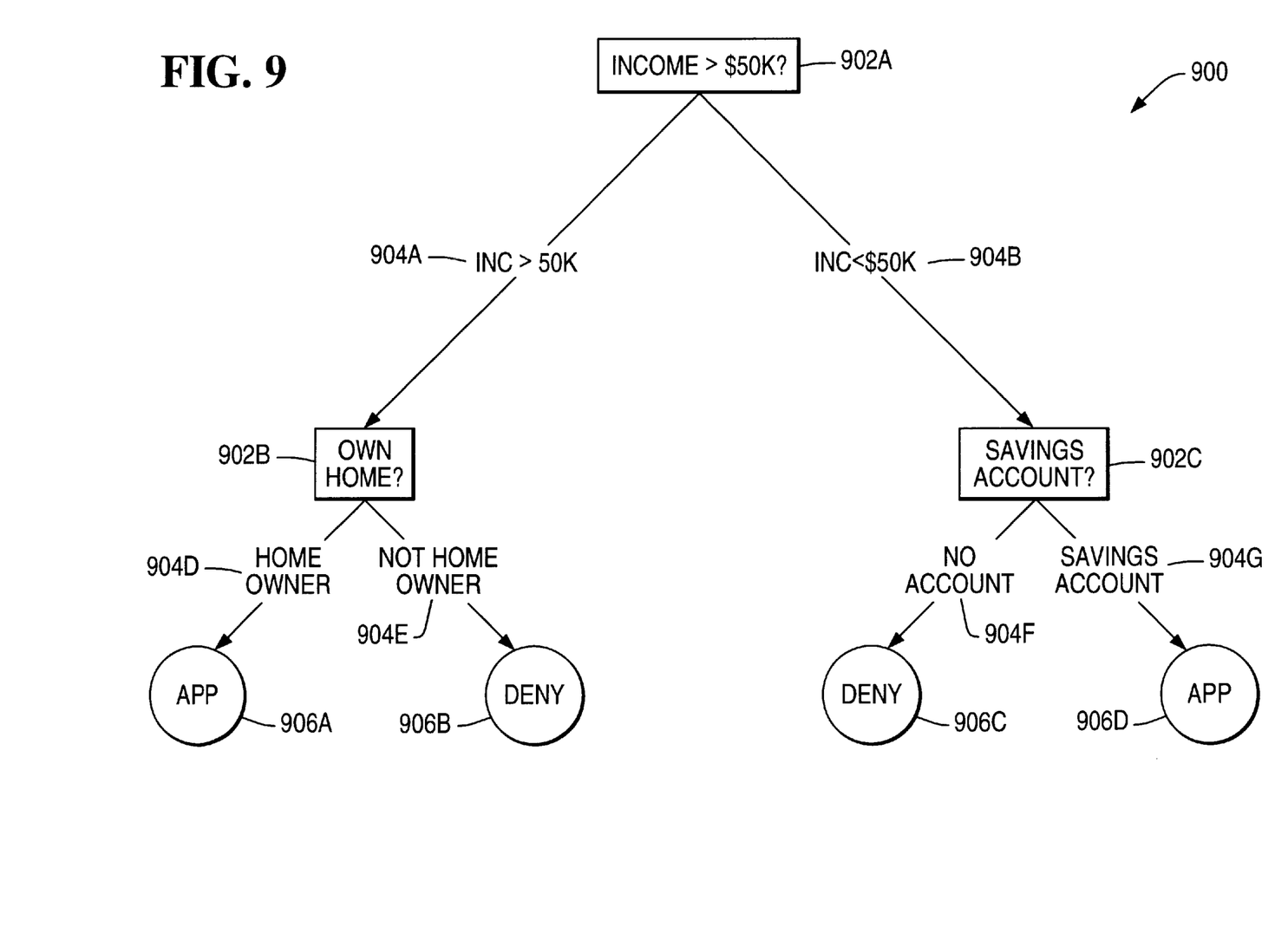
FIG. 9 is a diagram of a decision tree used with the process steps illustrated in FIG. 8.

FIG. 9 is a diagram of a decision tree used with the process steps illustrated in FIG. 8. In this embodiment, each outcome 906 is associated with a unique set of rules. That is, there is only one path to each particular outcome. Since the outcome defines the path (and hence, the set of rules), there is no need to record each rule as the logic proceeds down the decision tree 900. Instead, once the outcome is reached, a mapping can be used to uniquely identify the rule set so that it can be provided to the user.

In one embodiment, the outcome identification (referred to as the "leaf ID), since, the set of outcome are analogous to leaves on a tree), is recorded in a result table, and the mapping of the identification for the outcome to the rule set is accomplished by joining the result table with a rule table having the outcome identification and the rule set.

Figure 10:
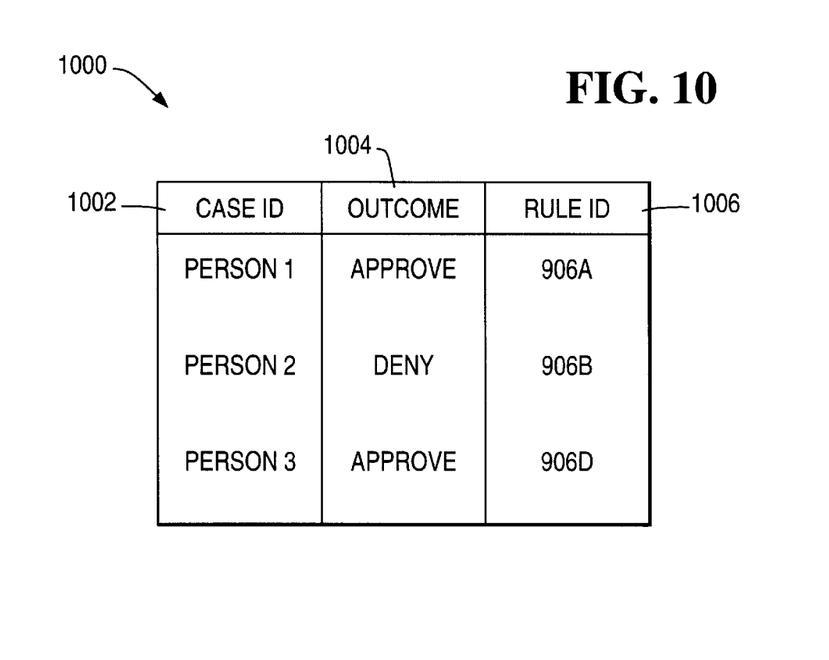
FIG. 10 is a diagram presenting another embodiment of the result table.

FIG. 10 is a diagram presenting an illustrative embodiment of the foregoing result table 1000. The result table 1000 comprises a first column 1002 having an identification describing the particular case (application of the hierarchical set of decision criteria to the data). An optional second column 1004 indicates the outcome for the case (in the illustrated example, whether the loan was approved or disapproved). A third column 1006 stores an identification (i.e. "leaf ID") for the outcome 1006 that was arrived at by passing through the decision tree 900, applying the decision criteria 902 to the data. The identification can comprise, for example, numbers, letters, or other characters at least locally unique to the result table 1000. A corresponding identification is also stored in a rule table. Different result table physical and logical models are possible.

Figure 11:
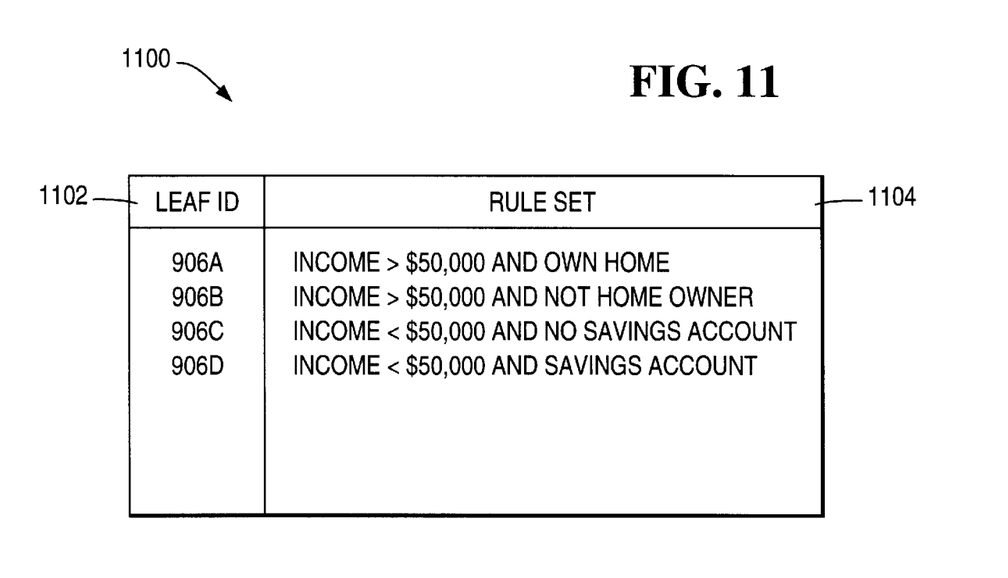
FIG. 11 is a diagram presenting another embodiment of a rule table.
Figure 12:
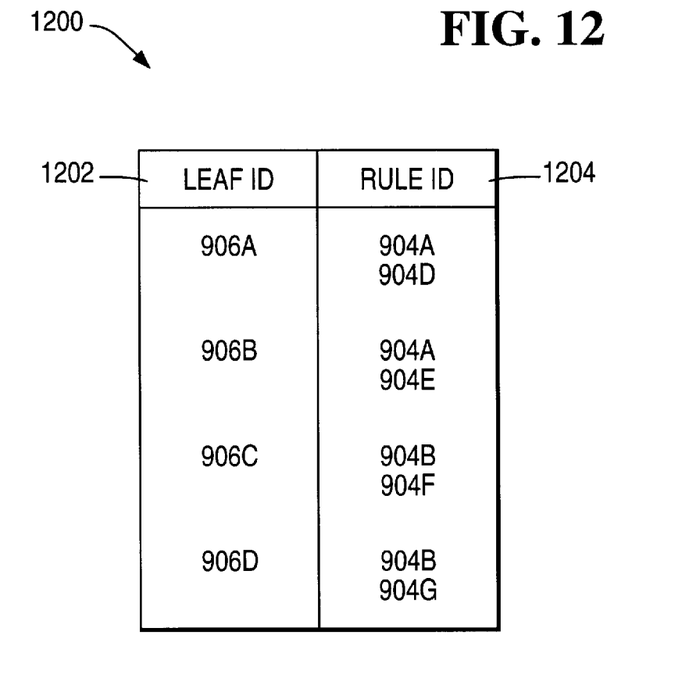
FIGS. 12 and 13 are diagrams showing an embodiment in which two tables are joined to produce the result table.
Figure 13:
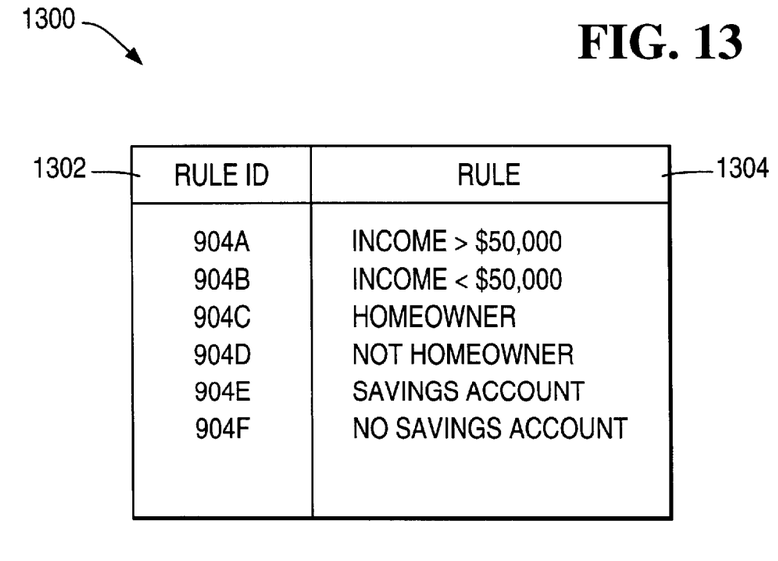

FIG. 11 is a diagram presenting an illustrative embodiment of a rule table 1100. The rule table 1100 includes a first column 1 102 storing an identification for all of the decision tree 900 rules 904. The rule table 1100 also includes a column storing the rule sets with the rules 904 obtained by passing through the decision tree 900. Hence, the rule table 1100 provides a mapping between the outcome identification and the rule set. The rule table 1100 and the result table 1000 can be joined on the leaf identification to retrieve the recorded rules. In still another embodiment of the present invention, the result table in FIG. 10 is joined with two tables rather than one (FIG. 11). These two tables are shown in FIGS. 12 and 13. FIG. 12 maps the leaf ID to the rule IDs for the rules in the rule set corresponding to the leaf, and FIG. 13 maps the rule IDs to the rules.

In another embodiment of the present invention, the mapping tables, such as those shown in FIGS. 10–13 are built by decision tree induction algorithm. Decision tree induction algorithms are used to build executable code that implements decision trees such as those shown in FIGS. 2 and 9. In this embodiment, the induction algorithm is modified to generate additional code to build the mapping tables shown in FIGS. 12 and 13, and to place additional code in the generated decision tree model that records the leaf ID (in addition to the case ID and the outcome) in a result table at execution time. Such code can be generated in an appropriate language, such as SQL. The code can then be applied (or "deployed") with the generated model against new customer records, to make automated decisions, and to also record, via the described tables, the information related to each decision.

Conclusion

This concludes the description of the preferred embodiments of the present invention. In summary, the present invention describes a method, apparatus, and article of manufacture for providing a description of logic used in determining an outcome based on automatic processing of data.

The method comprises the steps of hierarchically applying a series of decision criteria to the data to arrive at the outcome, while recording a rule determined from application of each decision criteria to the data, and later retrieving the recorded rules. The article of manufacture comprises a data storage device tangibly embodying instructions to perform the method steps outlined above, and the apparatus comprises a means for performing these method steps.

This provides an automated way of recording the rule that applies to each decision made by a decision tree model, thereby making all decisions easily explainable. For each case processed by the model during execution of the decision tree, as each case is passed through the tree, the rule that applies to the case is recorded, along with the decision.

One embodiment of the invention covers extensions to decision tree induction algorithms to generate a decision tree model that is extended with additional logic to perform the task of recording the individual decisions when it is later executed.

The foregoing description of the preferred embodiments of the invention has been presented for the purposes of illustration and description. It is not intended to be exhaustive or to limit the invention to the precise form disclosed. Many modifications and variations are possible in light of the above teaching. For example although the foregoing has been described with respect to its application to user data provided to customers, the present invention can be applied provide information about automated decisions in other contexts as well. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method storable on a recordable media for providing a description of logic used in determining an outcome based on processing of data, wherein the logic is substantially describable by a decision tree having a hierarchical set of decision criteria having rules associated therewith, the method comprising the steps of:

hierarchically applying a series of decision criteria to the data to arrive at the outcome, while recording a rule determined from application of each decision criteria to the data;

recording an identification of the rule obtained from the application of each decision criteria to the data in a results table having a first column comprising an identification of the user, a second column associated with the outcome, and a third column having the identification for each recorded rule; and retrieving the recorded rules, including the step of joining the results table with a rule table having the set of rules associated with the decision criteria.

2. The method of claim 1, wherein the rule table further comprises an identification for each role in the set of rules associated with the decision criteria, and wherein:

the step of hierarchically applying the series of decision criteria to the data further comprises the step of recording the identification for each recorded rule in the results table while hierarchically applying a series of the set of rules to the data to arrive at the outcome; and the step of joining the result table with the rules table having the set of rules comprises the step of joining the result table with the rules table using the identification.

3. The method of claim 1, further comprising the step of providing the retrieved recorded rules to a user.

4. The method of claim 3, wherein the step of providing the recorded rules to the user comprises the step of reporting the joined result table and rule table to the user.

5. The method of claim 1, wherein the set of decision criteria is hierarchically organized by correlation to a target outcome.

6. The method of claim 1, wherein the step of hierarchically applying the set of rules to the data to arrive at the outcome comprises the steps of:

applying a first decision criteria to the data to determine a first rule;

recording an identification for the first rule in the result table;

applying a second decision criteria determined by application of the first rule to the data, wherein the first decision criteria is hierarchically superior to the second decision criteria; and recording an identification for the second rule in the result table.

7. The method of claim 1, further comprising the step of deriving the decision tree from the logic and the data.

8. An apparatus for providing a description of logic used in determining an outcome based on processing of data, wherein the logic is substantially describable by a decision tree having a hierarchical set of decision criteria having rules associated therewith, the apparatus comprising:

means for hierarchically applying a series of decision criteria to the data to arrive at the outcome, while recording a rule determined from application of each decision criteria to the data;

means for recording an identification of the rule obtained from the application of each decision criteria to the data in a results table having a first column comprising an identification of the user, a second column associated with the outcome, and a third column having the identification for each recorded rule; and means for retrieving the recorded rules, including means for joining the results table with a rule table having the set of rules associated with the decision criteria.

9. The apparatus of claim 8, wherein the rule table further comprises an identification for each rule in the set of rules associated with the decision criteria, and wherein:

the means for hierarchically applying the series of decision criteria to the data further comprises means for recording the identification for each recorded rule in the results table while hierarchically applying a series of the set of rules to the data to arrive at the outcome; and the means for joining the result table with the rules table having the set of rules comprises means for joining the result table with the rules table using the identification.

10. The apparatus of claim 8, further comprising means for providing the retrieved recorded rules to a user.

11. The apparatus of claim 10, wherein the means for providing the recorded rules to the user comprises means for reporting the joined result table and rule table to the user.

12. The apparatus of claim 8, wherein the set of decision criteria is hierarchically organized by correlation to a target outcome.

13. The apparatus of claim 8, wherein the means for hierarchically applying the set of rules to the data to arrive at the outcome comprises:

means for applying a first decision criteria to the data to determine a first rule;

means for recording an identification for the first rule in the result table;

means for applying a second decision criteria determined by application of the first rule to the data, wherein the first decision criteria is hierarchically superior to the second decision criteria;

means for recording an identification for the second rule in the result table.

14. The apparatus of claim 8, further comprising the means for deriving the decision tree from the logic and the data.

15. A program storage device, readable by a computer, tangibly embodying at least one program of instructions executable by the computer to perform method steps of providing a description of logic used in determining an outcome based on processing of data, wherein the logic is substantially describable by a decision tree having a hierarchical set of decision criteria having rules associated therewith, the method steps comprising the steps of:

hierarchically applying a series of decision criteria to the data to arrive at the outcome, while recording a rule determined from application of each decision criteria to the data;

recording an identification of the rule obtained from the application of each decision criteria to the data in a results table having a first column comprising an identification of the user, a second column associated with the outcome, and a third column having the identification for each recorded rule; and retrieving the recorded rules, including the step of joining the results table with a rule table having the set of rules associated with the decision criteria.

16. The program storage device of claim 15, wherein the rule table further comprises an identification for each rule in the set of rules associated with the decision criteria, and wherein:

the method step of hierarchically applying the series of decision criteria to the data further comprises the step of recording the identification for each recorded rule in the results table while hierarchically applying a series of the set of rules to the data to arrive at the outcome; and the method step of joining the result table with the rules table having the set of rules comprises the step of joining the result table with the rules table with using the identification.

17. The program storage device of claim 15, wherein the method further comprises the step of providing the retrieved recorded rules to a user.

18. The program storage device of claim 17, wherein the method step of providing the recorded rules to the user comprises the method step of reporting the joined result and rule table to the user.

19. The program storage device of claim 15, wherein the set of decision criteria is hierarchically organized by correlation to a target outcome.

20. The program device of claim 15, wherein the method step of hierarchically applying the set of rules to the data to arrive at the outcome comprises the method steps of:

applying a first decision criteria to the data to determine a first rule;

recording an identification for the first rule in the result table;

applying a second decision criteria determined by application of the first rule to the data wherein the first decision criteria is hierarchically superior to the second decision criteria;

recording an identification for the second rule in the result table.

21. The program storage device of claim 15, wherein the method steps further comprise the step of deriving the decision tree from the logic and the data.

22. A computer implemented method storable on a recordable media for providing a description of logic used in determining an outcome based on processing of data, wherein the logic is substantially describable by a decision tree, the methods comprising the steps of:

hierarchically applying a series of decision criteria to the data to arrive at the outcome, wherein the each application of a decision criteria in the series of decision to the data defines a rule;

recording an outcome identification in a result table having a first column including a user identification and a second column having the outcome identification; and mapping the outcome identification to a rule set having the rules defined by application of the series of decision criteria to the table with a rule table having outcome identification and the rule set.

23. The method of claim 22, further comprising the step of providing the rule set to the user.

24. The method of claim 22, further comprising the step of deriving the decision tree from the logic and the data.

25. The method of claim 22, wherein the step of deriving the decision tree from the logic and the data comprises the step of:

extending a decision tree induction algorithm wherein the algorithm generates SQL statements to be later performed defining a predictive model for the decision tree, to additionally generate SQL statements that will generate tables for mapping the outcome identification to the rule set.

26. An apparatus for providing a description of logic used in determining an outcome based on processing of data, wherein the logic is substantially describable by a decision tree, comprising:

means for hierarchically applying a series of decision criteria to the data to arrive at an outcome, wherein the each application of a decision criteria in the series of decision criteria to the data defines a rule;

means for recording an outcome identification in a result table having a first column including a user identification and second column having the outcome identification; and     means for mapping the outcome identification to a rule set having the rules defined by application of the series of decision criteria to the data, including means for joining the result table with a rule table having the outcome identification and the rules set.

27. The apparatus of claim 26, further comprising means for providing the rule set to the user.

28. The apparatus of claim 26, further comprising means for deriving the decision tree from the logic and the data.

29. The apparatus of claim 26, wherein the means for deriving the decision tree from the logic and the data comprises:

means for extending a decision tree induction algorithm wherein the algorithm generates SQL statements to be later performed defining a predictive model for the decision tree, to additionally generate SQL statement that will generate tables for mapping the outcome identification to the rule set.

30. A program storage device, readable be a computer, tangibly embodying at least one program of instructions executable be the computer to perform method steps of providing a description of logic used in determining an outcome based on processing of data, wherein the logic is substantially describable by a decision criteria to the data to arrive at an outcome, wherein the each application of a decision criteria in the series of decision criteria to the data defines a rule;

recording an outcome identification in a result table having a first column including a user identification and a second column having the outcome identification; and     mapping the outcome identification to a rule set having the rules defined by application of the series of decision criteria to the data, including the step of joining the result table with a rule table having the outcome identification and the rule set.

31. The program storage device of claim 30, wherein the method steps further comprise the step of providing the rule set to the user.

32. The program storage device of claim 30, wherein the method steps further comprise the method step of deriving the decision tree from the logic and the data.

33. The program storage device of claim 30, wherein the method step of deriving the decision tree from the logic and the data comprises the step of:

extending a decision tree induction algorithm wherein the algorithm generate SQL statements to be later performed defining a predictive model for the decision tree, to additionally generate SQL statements that will generate tables for mapping the outcome identification to the rule set.

\* \* \* \* \*

UNITED STATES PATENT AND TRADEMARK OFFICE
CERTIFICATE OF CORRECTION

PATENT NO. : 6,631,361 B1
DATED : October 7, 2003
INVENTOR(S) : O'Flaherty, K. and Tate, B. D.

It is certified that error appears in the above-identified patent and that said Letters Patent is hereby corrected as shown below:

Column 10,
Line 33, after "each" delete "role" and insert -- rule --

Column 12,
Line 27, after "result" insert -- table --
Line 55, after "decision", second occurrence, insert -- criteria --

Column 14,
Line 1, after "SQL" delete "statement" and insert -- statements --
Line 4, after "readable" delete "be" and insert -- by --
Line 6, after "executable" delete "be" and insert -- by --
Line 9, after "decision" delete "criteria" and insert -- tree, the method steps comprising the steps of hierarchically applying a series of decision criteria --

Signed and Sealed this

Twenty-first Day of June, 2005

JON W. DUDAS
*Director of the United States Patent and Trademark Office*